H. H. BENSON & A. H. ASPROOTH.
FLUID CLUTCH.
APPLICATION FILED JULY 17, 1914.
1,145,464.
Patented July 6, 1915.
3 SHEETS—SHEET 2.
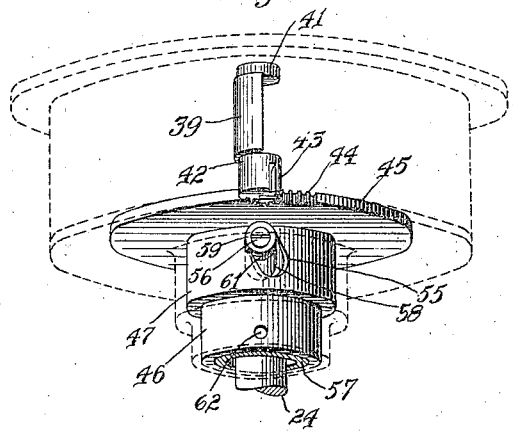
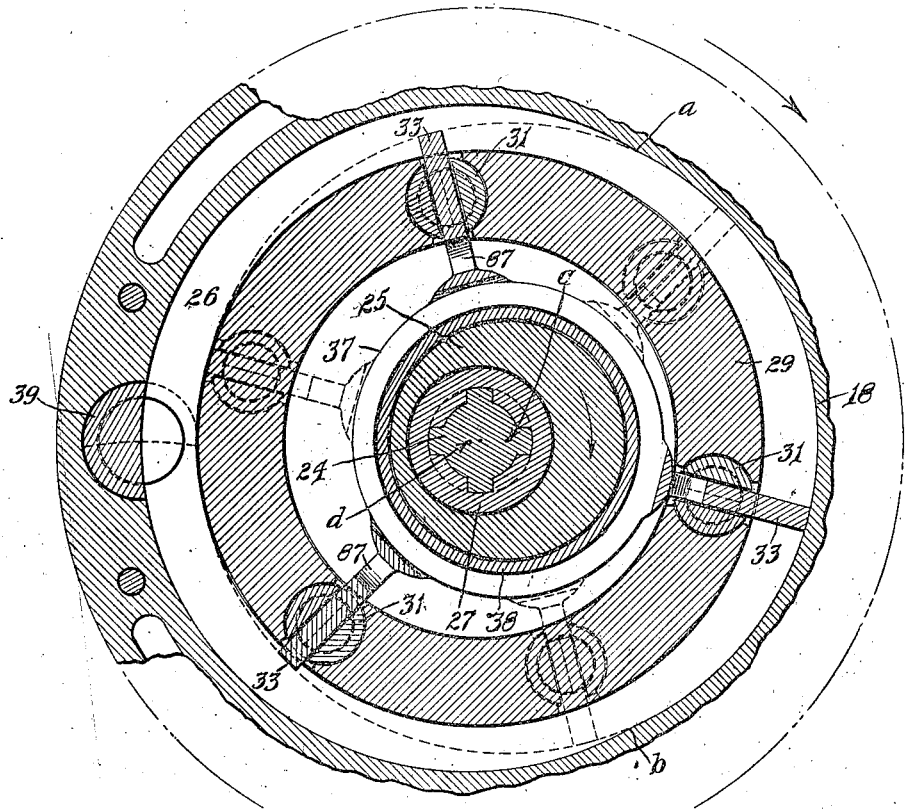

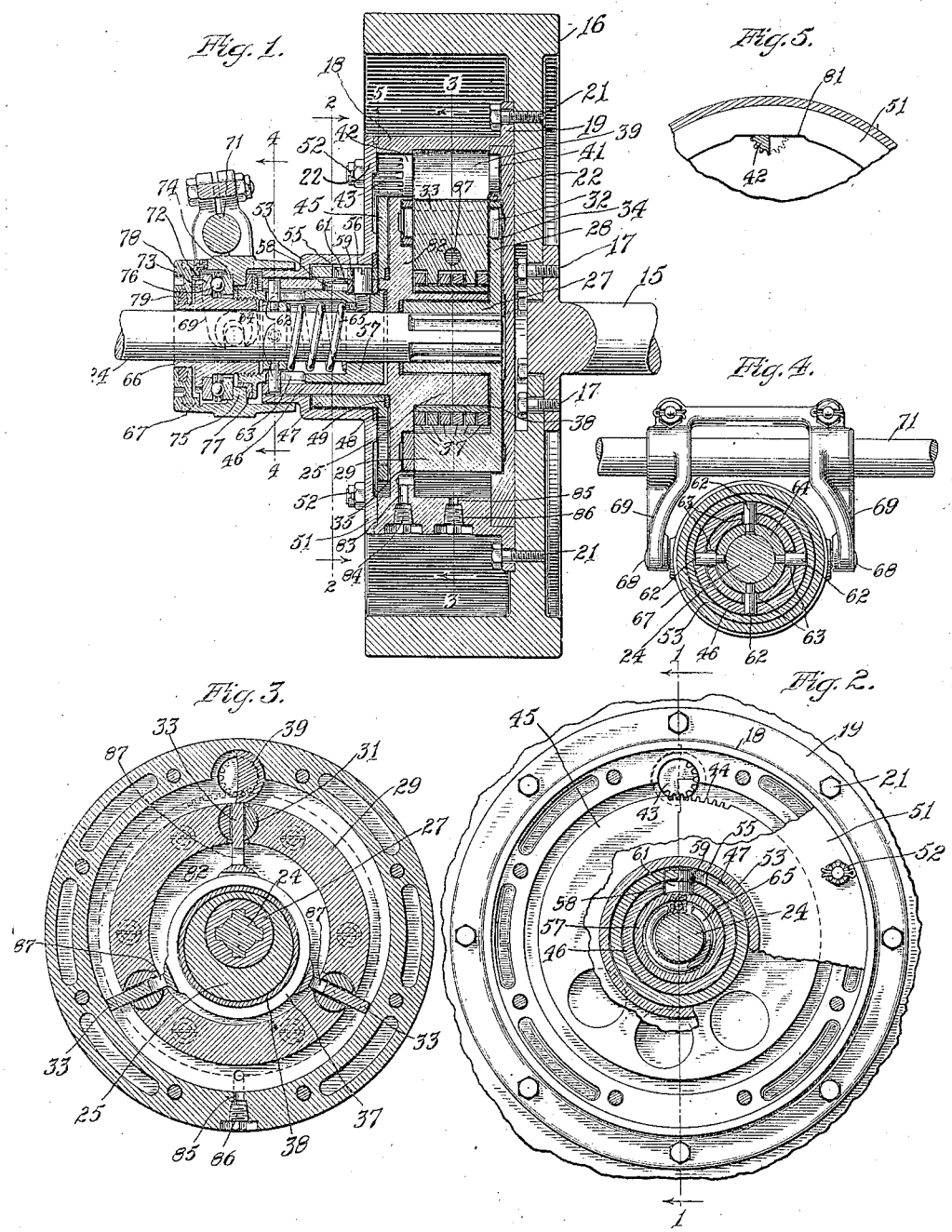

H. H. BENSON & A. H. ASPROOTH.
FLUID CLUTCH.
APPLICATION FILED JULY 17, 1914.
1,145,464.
Patented July 6, 1915.
3 SHEETS—SHEET 3.
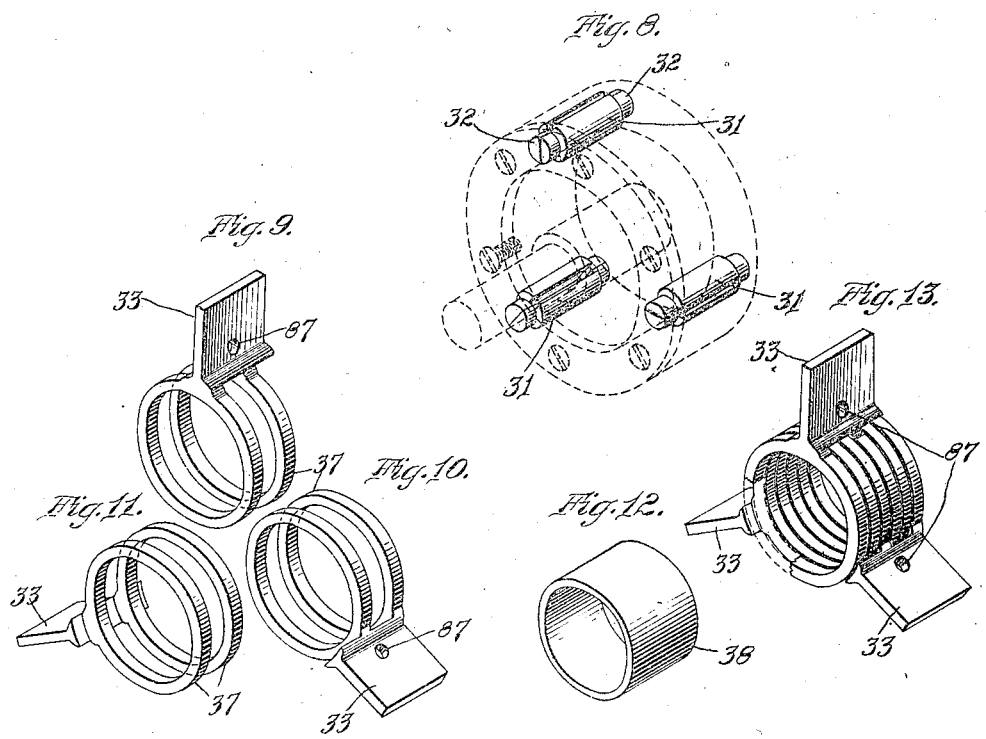
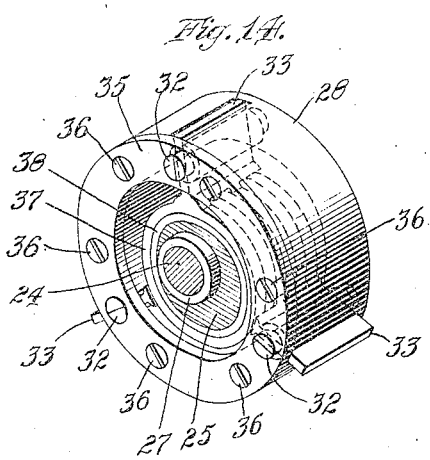
Witnesses:
W. L. Dow
D. E. Atkinson
Inventors:
Harry H. Benson
Axel Hj. Asprooth,
By Pond & Wilson
Attys.

UNITED STATES PATENT OFFICE.

HARRY H. BENSON AND AXEL HJ. ASPROOTH, OF ROCKFORD, ILLINOIS.

FLUID-CLUTCH.

1,145,464.   Specification of Letters Patent.   Patented July 6, 1915.

Application filed July 17, 1914.   Serial No. 851,531.

*To all whom it may concern:*

Be it known that we, HARRY H. BENSON and AXEL HJ. ASPROOTH, citizens of the United States, residing at Rockford, in the county of Winnebago and State of Illinois, have invented certain new and useful Improvements in Fluid-Clutches, of which the following is a specification.

This invention relates in general to clutches, and has more particular reference to clutches in which the power is transmitted from the driving to the driven member through the intermediary of a suitable fluid, such as oil, for instance. Clutches of this general character are commonly known as fluid clutches.

Our present invention designs to provide a clutch of this general character, which will be particularly adapted for use in automobiles, and one of the primary objects of the invention is to provide a clutch which will be accurate and efficient in its operation, strong and durable in construction, and which is capable of being applied to and carried by the fly-wheel of an ordinary gas engine.

Another object of the invention is the provision of a clutch embodying novel means for varying the relative speed of the driving and driven members and novel means for controlling the operation of said means.

A further object is to provide improved fluid actuated blades, together with improved mountings, and also novel mechanism for operating same.

Still another object is to provide novel blade guides for guiding the blades and maintaining them in proper position during their operation.

A still further object is to provide a chamber in which the fluid is contained, of novel contour, peculiarly adapted for coöperation with the blades, and the mechanism for actuating same.

A still further object is the provision of a fluid controlling valve, together with novel and improved means for operating the same, and preventing excessive movement thereof beyond the desired limits of travel.

Other objects and many of the attendant advantages of this invention will be readily apparent to those skilled in the art as the same becomes better understood by referring to the following description when considered in connection with the accompanying drawings throughout the various views of which like reference characters refer to similar parts.

Referring to the drawings: Figure 1 is a longitudinal sectional view of a clutch embodying our invention, taken on the line 1—1 of Fig. 2. Fig. 2 is a sectional view on the line 2—2 of Fig. 1. Fig. 3 is a transverse sectional view on the line 3—3 of Fig. 1. Fig. 4 is a sectional view on line 4—4 of Fig. 1. Fig. 5 is a fragmentary sectional view on the line 5—5 of Fig. 1. Fig. 6 is a perspective view of the fluid controlling valve and part of the controlling mechanism therefor, certain parts of the clutch casing being shown in dotted lines. Fig. 7 is an enlarged transverse sectional view of the clutch. Fig. 8 is a perspective view showing the structure and location of the blade guides. Figs. 9, 10, 11 are perspective views of the blades. Fig. 12 is a perspective view of the bearing ring. Fig. 13 is a perspective view of the blades in assembled relation; and Fig. 14 is a perspective view of certain parts of the driven member.

Referring now to the drawing and more particularly to Fig. 1 thereof, reference character 15 indicates the driving or main shaft of a gas engine, upon which the fly-wheel 16 is mounted by means of bolts 17. The drive-wheel, it should be understood, is shown merely for purposes of illustration, since it will be manifest that the driving member of our improved clutch may be mounted upon any desired rotating drive shaft. The driving member of the clutch, which forms part of the fluid chamber, comprises an annular ring or shell 18 forming the side walls of the fluid chamber and equipped with a radial flange 19, securely fastened to the fly-wheel by bolts 21. The rear or inner wall 22 of the chamber is of disk shape, and has a shouldered joint connection with the outer wall 18. The front wall 23 of the fluid chamber is formed integrally with the outer wall 18, and is provided at its center with an opening adapted to loosely receive the driven shaft 24. The rear face of the wall 23 is formed to provide a rearwardly projecting eccentric hub 25, (best shown in Figs. 3 and 7). The fluid chamber 26, circumscribed by the wall 18, is of peculiar contour, as will be best seen in Fig. 7, one portion of the wall between the points a and b comprising an arc struck from the point c as a center, concentric with the eccentric hub 25 on the wall 23. The remainder of the wall of the fluid chamber comprises an arc struck from the point d as a center, this point being disposed at one side of the axis of the shaft 24. The circumferential walls of the fluid chamber are therefore, while generally circular in shape, composed of the intersecting arcs of two circles struck from different centers and having different radii.

The driven shaft 24, which is axially alined with the drive shaft 15, has a hub 27 fixed thereon as shown in Fig. 1, said hub being provided at its inner end with an integral radially extending portion 28 provided around its periphery with an annular forwardly projecting flange or wall 29 disposed concentrically with the shaft and cored at intervals to receive the cylindrical blade-guides 31, as shown in Fig. 7. Each blade guide, as will be apparent from Fig. 8, has reduced ends 32, and the guides are split longitudinally, and machined to receive the blades 33, which project transversely through the guides. The rear end of each guide is set into a socket 34 formed in the radial portion 28, as shown in Fig. 1, and the guides are maintained in position at their forward ends by a ring 35 mounted on the forward edge of the flange 29, secured in position by screws 36, and provided with suitable sockets to receive the forward ends of the blade guides. The structure of the blades 33 is best shown in Figs. 9 and 11 inclusive from which it will be apparent that each blade is provided at its base with a plurality of integral rings 37 spaced apart so as to nest together and form a cylindrical core, as shown in Fig. 13. A bearing ring 38 is adapted to set within the core formed by the blade rings and also to set loosely over the eccentric hub 25, as clearly shown in Figs. 1, 3 and 7. Since the blades are held by the guide carrying flange 29, which is fixed with respect to the driven shaft, against rotation with the driving member, except on rotation of the driven shaft, it will be obvious that rotation of the driving member including the eccentric hub 25, will successively project and retract the blades radially of the fluid chamber. As the driving member including the fluid chamber is rotated in the direction indicated by the arrow in Fig. 7, the blades will successively contact with that portion of the wall 18 between the points b and a to completely divide or close the fluid chamber during this period of the travel, and will be successively retracted, so that their edges will follow the dotted line shown in Fig. 7, and so that at one point they will be wholly withdrawn from the fluid chamber into the flange 29.

It should now be apparent that if the fluid chamber is divided or closed by valve or other suitable mechanism at the point where the blades are withdrawn from the chamber, the fluid in the chamber between the closure and the blade contacting with the wall 18, will be trapped so that relative movement between the fluid casing and the blade will be prevented, with the result that the member 29 will be driven by the blades, thereby driving the driven shaft 24.

The closure of the fluid chamber to lock, through the intermediary of the fluid in the chamber, the blade with respect to the revolving fluid casing, is effected by means of a valve 39, having end-bearing portions 41 and 42, journaled respectively in suitable sockets formed in the disk 22 and the member 23. That portion of the valve projecting transversely across the fluid chamber has a portion of its body cut away as shown in Figs. 6 and 7, so that when the valve is in open position, it forms a continuation of the fluid chamber wall, but when in closed position as shown in Fig. 3, it completely closes the space between the wall 18 and the flange 29, thereby preventing flow of the fluid from the one side of the valve to the other.

It will be evident from the foregoing that when the valve is fully open, the fluid casing carried by the driving member and in which the valve is mounted will rotate freely, while the driven member carrying the blades will remain stationary. When the valve is completely closed, however, the oil in the chamber will be trapped between the valve and a blade so that the blades and consequently the driven member will be immovably locked with respect to the driving member. Should the valve be partially open so as to permit the passage of a small or any desired portion of oil past the valve, the driven member will be rotated at a slower speed than the driving member.

The mechanism for controlling the valve, so as to secure the desired speed of the driven member from the constant speed of the driving member, will now be described.

The reduced end 42 of the valve is provided throughout a portion of its periphery with gear teeth 43, adapted to mesh with corresponding teeth 44 on a disk 45, mounted concentrically with the driven shaft 24 upon a sleeve or hub 46, projecting laterally from the front face of the member 23. The disk 45 is formed to provide a hub or sleeve 47, which loosely embraces the sleeve 46, and suitable washers 48 and 49 are employed to maintain the disk in proper position. The front face of the disk is covered by a plate 51, secured by bolts 52 to the peripheral wall 18 of the fluid chamber. This plate also has a hub or sleeve 53, shaped as shown in Fig. 1 to overlie the plate 45 and its sleeve 47, thereby holding said disk against displacement, but permitting rotation thereof.

It will be evident that limited rotation of the disk 45 will impart the necessary rotative movements to the valve 39 to open and close the same. For the purpose of securing this movement of the disk its hub 47 is provided with an inclined slot 55, adapted to receive a pin 56, projecting radially from a longitudinally movable sleeve 57, loosely embracing the driven shaft 24. This pin also projects through a longitudinally disposed slot 58 formed in the sleeve 46 directly beneath the inclined slot 55, and the pin is preferably equipped with anti-friction rollers 59, and 61, disposed in the slots 55 and 58 respectively. The sleeve 57 is rotated by the sleeve or hub 46 through a series of pins 62 projecting inwardly from the sleeve 46, through elongated slots 63 formed in the sleeve 57. The inner ends of the pins are connected by a collar 64, loosely embracing the shaft 24. The sleeve 57 is normally maintained in the position shown in Fig. 1 by means of a coiled expansion spring 65, bearing at one end against the collar 64, and at its other end against an internal annular shoulder formed within the sleeve 57. When the parts are in the normal position shown in Figs. 1 and 3, the valve 39 is completely closed, and the driven member is locked to the driving member to rotate therewith at the same speed.

For the purpose of moving the sleeve 57 outwardly against the force of the spring 65, we have threaded to its outer end a collar 66, which is surrounded by sleeve 67, having laterally projecting studs 68, connected with the lower ends of arms 69 fixed to and projecting downwardly from a shaft 71, which may be oscillated by any manually operated mechanism (not shown). A ball race 72 abuts against the radial flange 73 formed on the collar 66, and a companion ball race 74 abuts against a shoulder 75 formed on the sleeve 67. Suitable balls 76 disposed between the races, provide an anti-friction thrust bearing which takes up the end thrust of the sleeves and collar. In order to provide a rigid and dust-proof construction, a gasket 77 is preferably interposed between the shoulder 75 and a radial flange of the sleeve 57, and the space between the outer ends of the sleeve 66 and the sleeve 67 is closed by a screw cap 78 equipped with a suitable gasket 79.

It will be manifest that the valve 39 is designed to move from the position shown in Fig. 3 to that shown in Fig. 7 through an arc not greater than 90 degrees, and for the purpose of limiting the movements of the valve to this amount, the extremity of the reduced bearing portion 42 is cut away as indicated in Fig. 5, and the plate 51 is shaped to provide a straight-line shoulder 81 against which the normally disposed faces of the valve 39 will abut when the valve reaches the limits of its opening and closing movements.

When the clutch is assembled the fluid chamber 26 and the chamber 82, within the guide-ring 29, are filled with oil or other fluid of suitable consistency. The oil is introduced through a channel 83 (Fig. 1), which is normally closed by plug 84, and an air vent 85, normally closed by a plug 86, permits the escape of air during the filling operations. It will be understood, of course, that while the oil is being introduced the clutch will be positioned with the plugs 84 and 86 uppermost. The blades 33 fit rather loosely in the guides 31, so that the fluid may flow back and forth between the chambers 26 and 82, and in order that the fluid in the chamber 82 may not be trapped between the blades so as to unduly restrict or retard the running of the device, we prefer to provide each of the blades 33 with an opening 87, adjacent its base, through which the fluid may readily flow as the blades are revolved. Assuming now that the parts are in the normal position shown in Figs. 1 and 3, and that the driving member including the casing 18 and the eccentric hub 25 are revolving, it will be understood that a part of the fluid in the chamber 26 will be trapped between the valve 39 and that particular blade which is at the time contacting with the concentrically curved portion a—b of the casing wall 18, with the result that the driven member will be locked, through the intermediary of the oil in the chamber, to the driving member. Should it be desirable to reduce the speed of the driven member relatively to the constant speed of the driving member, the shaft 71 is rocked, to swing the arms 69 to the left, viewing Fig. 1, thereby drawing the sleeve 57 outwardly, and through the inter-engaging pin 56 and slot 55, imparting a slight rotative movement to the disk 45, which in turn will move the valve 39 the required amount to permit a pre-determined flow of fluid past the valve, so that a relative movement between the driving member and driven member will take place, and the desired reduction in speed of the driven member will be obtained. By manipulating the valve 39 any desired degree of relative movement between the driving and driven members may be secured. In one extreme position of the valve the driving member will rotate freely, while the driven member will remain stationary, and in the other extreme the two members will be locked substantially rigidly together.

It is believed that our invention and its mode of operation will be clearly understood from the foregoing without further description, and it will be obvious that the invention is not restricted to the particular construction shown and described, but is capable of considerable modification in details, and is circumscribed in scope only by the following claims.

We claim:

1. In a fluid clutch the combination of a driven shaft provided with a concentric blade-guiding ring, a driving member provided with a hub adapted to receive the end of said driven shaft, said hub being eccentric with respect to said shaft, a non-circular wall carried by the driving shaft, surrounding but spaced from said blade-guiding ring, and a plurality of blades projecting radially through said guiding ring, and having rings embracing said eccentric hub.

2. In a fluid clutch the combination of a driving member having an eccentric hub, and a non-circular wall forming the outer wall of a fluid chamber, a driven member having a concentric hub disposed within the eccentric hub of said driving member, and a concentric wall forming the inner wall of said fluid chamber, a plurality of blade guides, each in the form of a split cylinder carried by said last mentioned wall, blades embracing said eccentric hub and projecting through said blade guides, and means whereby said fluid chamber may be divided at will.

3. In a fluid clutch the combination of a driving member forming the circumferential walls of a fluid chamber, a driven member forming the inner walls of said chamber, a valve carried by the driving member and adapted to divide said chamber, a sleeve fixed with respect to said driving member, and extending around the shaft of said driven member, pins projecting inwardly radially from said sleeve, a collar loosely embracing said shaft and connecting the inner ends of said pins, a second sleeve disposed within said fixed sleeve and having slots engaging said pins to permit longitudinal movement of said second sleeve, an expansion spring interposed between said collar and said second sleeve, a pin carried by said second sleeve and projecting through and outwardly beyond a slot in said fixed sleeve, a disk meshing with said valve and having a hub surrounding said fixed sleeve and provided with an inclined slot engaging pin, and means for moving said second mentioned sleeve longitudinally to vary the position of said valve through the intermediary of said disk.

4. In a fluid clutch the combination of a driving member forming the circumferential walls of a fluid chamber, and having a centrally disposed eccentric hub, a driven member spaced within the outer walls of the fluid chamber forming the inner walls of a continuous fluid chamber surrounding the said driven member, a plurality of blades loosely embracing said eccentric hub and projecting through said inner walls into said fluid chamber and adapted to be extended by said eccentric hub to engage one side of the outer wall of the fluid chamber, means for varying the size of said fluid chamber at the other side thereof, and mechanism for controlling said means.

5. A fluid clutch comprising a blade provided at its base with a plurality of integral rings.

6. A fluid clutch comprising a driven member having a concentric driven shaft, a driving member having an eccentric hub surrounding said driven shaft, a sleeve surrounding said hub, a plurality of blades having rings embracing said sleeve, a guide ring carried by the driven member through which said blades project, and a circumferential wall surrounding said ring and spaced therefrom.

7. In a fluid clutch the combination of a circular member having parallel sockets adapted to receive cylindrical blade-guides, the deeper end of each socket being reduced in size to form a bearing portion, a blade-guide disposed in each socket and having a blade receiving opening, a blade projecting through each of said guides, and a ring secured to said circular member and provided with sockets to receive the reduced outer ends of said blade guides whereby the blade guides are supported by their reduced bearing ends.

8. In a fluid clutch, the combination of a driving member forming the circumferential walls of a fluid chamber, a driven member forming the inner walls of said chamber, a valve carried by the driving member and adapted to divide said chamber, a sleeve fixed with respect to said driving member and extending around the shaft of said driven member, a second sleeve extending around the driven member and being connected to the first mentioned sleeve so as to move rotatably therewith, but to be movable axially independently thereof, a disk meshing with said valve and having a hub extending about the shaft of said driven member, a connection between the said hub and second mentioned sleeve whereby the hub is oscillated by axial movement of the said second sleeve, and means for moving the said second mentioned sleeve axially to vary the position of said valve through the intermediary of said disk.

9. In a fluid clutch, the combination of axially alined driving and driven shafts, one of said shafts having a casing fixedly connected thereto inclosing a fluid chamber, a hub disposed within the fluid chamber eccentric with respect to said casing-connected shaft and being fixedly connected with said shaft, the other shaft having a ring member concentric therewith and fixedly connected thereto and being disposed within said fluid chamber surrounding the said hub whereby to form the inner wall to said fluid chamber, a plurality of blades extending radially through the ring member, the blades being adapted to engage at their outer ends a portion of the outer wall of the fluid chamber and to be moved into and out of said engagement by said eccentric hub, and a valve for closing the fluid chamber at the portion thereof where the blades are out of engagement with the said outer wall of the fluid chamber.

10. In a fluid clutch, the combination of axially alined driving and driven shafts, one of said shafts having fixedly connected thereto a casing forming the outer wall of a fluid chamber and having a hub disposed within the casing eccentric with respect to the shaft, the other shaft having fixedly connected thereto and concentric therewith, a ring member disposed intermediate said hub and outer wall and forming the inner wall to said fluid chamber, a plurality of blades extending radially through said ring member, the blades being movable into engagement with the outer wall of the fluid chamber by said eccentric hub and being adapted to engage only a portion of said outer wall, and valve means for closing a portion of the fluid chamber in which the blades do not engage the outer wall.

11. In a fluid clutch, the combination of axially alined driving and driven shafts, one of said shafts having fixedly connected thereto a casing forming the outer wall of a fluid chamber extending around the shaft and having a hub disposed within said chamber eccentric to the shaft, the other shaft having a ring member fixedly connected thereto and disposed within said fluid chamber surrounding said hub and being concentric with its shaft and forming the inner wall to the fluid chamber, a plurality of blades projecting radially through said ring member and having rings embracing said eccentric hub, said fluid chamber extending entirely around said ring member and said blades being movable by said eccentric hub into engagement with only a portion of the outer wall, and a valve for dividing said chamber at the portion thereof where the blades are out of engagement with the outer wall.

HARRY H. BENSON.
AXEL HJ. ASPROOTH.

Witnesses:
  SAMUEL N. POND,
  D. E. ATKINSON.